Jan. 22, 1963 — R. R. ANNIS — 3,074,489
VARIABLE PITCH FAN FOR SMALL MOTORS
Filed Nov. 23, 1959 — 2 Sheets-Sheet 2

Inventor
Richard R. Annis

United States Patent Office 3,074,489
Patented Jan. 22, 1963

3,074,489
VARIABLE PITCH FAN FOR SMALL MOTORS
Richard R. Annis, Milwaukee, Wis., assignor to John Oster Manufacturing Co., Milwaukee, Wis., a corporation of Wisconsin
Filed Nov. 23, 1959, Ser. No. 854,919
4 Claims. (Cl. 170—160.5)

This invention relates to small propellers, such as are used for moving cooling air through electric motors and the like, and refers more particularly to a simple and inexpensive variable pitch propeller which is especially adapted for use as a cooling fan on fractional horsepower electric motors.

It is known that the noise produced by an axial type fan varies directly as the capacity of the fan and the square of the pressure rise across it, and fan capacity varies as the sine of the blade pitch angle while the pressure rise across the fan varies as the square root of the sine of the blade pitch angle. It follows that the noise output of an axial type fan varies as the square of the sine of the pitch angle, or in other words decreases with decreasing blade pitch.

With these facts known, it has long been recognized that a variable pitch fan, having blades that change pitch automatically in response to air load and centrifugal force, would be desirable in many cooling applications on motors and the like that operate over a wide range of speeds, for the reason that such a fan would be less noisy at high speeds than one having blades of a fixed pitch.

The advantages of a simple and inexpensive variable pitch fan are particularly apparent in the case of fractional horsepower universal type electric motors, such as are commonly used for powering household appliances. A typical universal type motor may operate in the neighborhood of 8,000 to 10,000 r.p.m. when loaded, and turn at speeds of around 20,000 r.p.m. when running free. Since such a motor generates most heat when it is loaded, a variable pitch fan that would afford adequate cooling capacity at the lower speeds would also be satisfactory for high speed cooling and would have the important advantage of producing substantially less noise at high speeds than a fixed pitch fan having the same low speed cooling capacity.

In the past, however, no variable pitch fan has been available that was sufficiently simple and inexpensive for small size motors, and it was considered necessary to provide such motors with fans having a fixed pitch, accepting as inevitable the high noise level of the fan when the motor was running at high speeds.

By contrast, the present invention has for its object the provision of a simple and inexpensive cooling fan, especially suitable for small fractional-horsepower electric motors, which is both easy to manufacture and easy to install on a motor and which possesses the very desirable property of automatically decreasing the pitch of its blades at rotational speeds above a predetermined r.p.m. so as to operate at such speeds with a substantially lower noise level than would be produced by a corresponding fixed pitch fan.

More specifically, it is an object of this invention to provide an automatic variable pitch cooling fan for small electric motors or the like which can be readily and very inexpensively formed as a simple unitary sheet metal stamping, capable of being produced from raw sheet stock in a progressive type die.

The extent to which these objects have been realized in the propeller fan of this invention is exemplified by comparative tests on a food comminuting machine powered with a universal type motor. At high motor speeds a fan embodying the principles of this invention had a noise level about 3 db below that of the fixed pitch fan it replaced, and it produced sound of a frequency more pleasing to the ear than the noise of the fixed pitch fan. Motor cooling was of course completely adequate with the variable pitch fan, and its cost was about ½¢ less than that of the fixed pitch fan.

Another specific object of this invention resides in the provision of an automatic variable pitch fan of the character described, adapted to be formed from a single piece of resiliently flexible sheet metal and having blade portions adapted to flex to a lower pitch at high rotational speeds in response to centrifugal force and air loads, and a hub portion which is integral with the blade portions but which is nevertheless stiff and rigid so as not to be affected by flexing of the blades.

It is also a specific object of this invention to provide a simple and inexpensive variable pitch fan of the character described which is readily securable to the shaft of an electric motor or the like and wherein stiffening means, which afford rigidity in the hub portion of the fan, also serve to cooperate with means by which the fan is secured to the shaft to constrain the fan to rotate with the shaft.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which.

Figure 1:
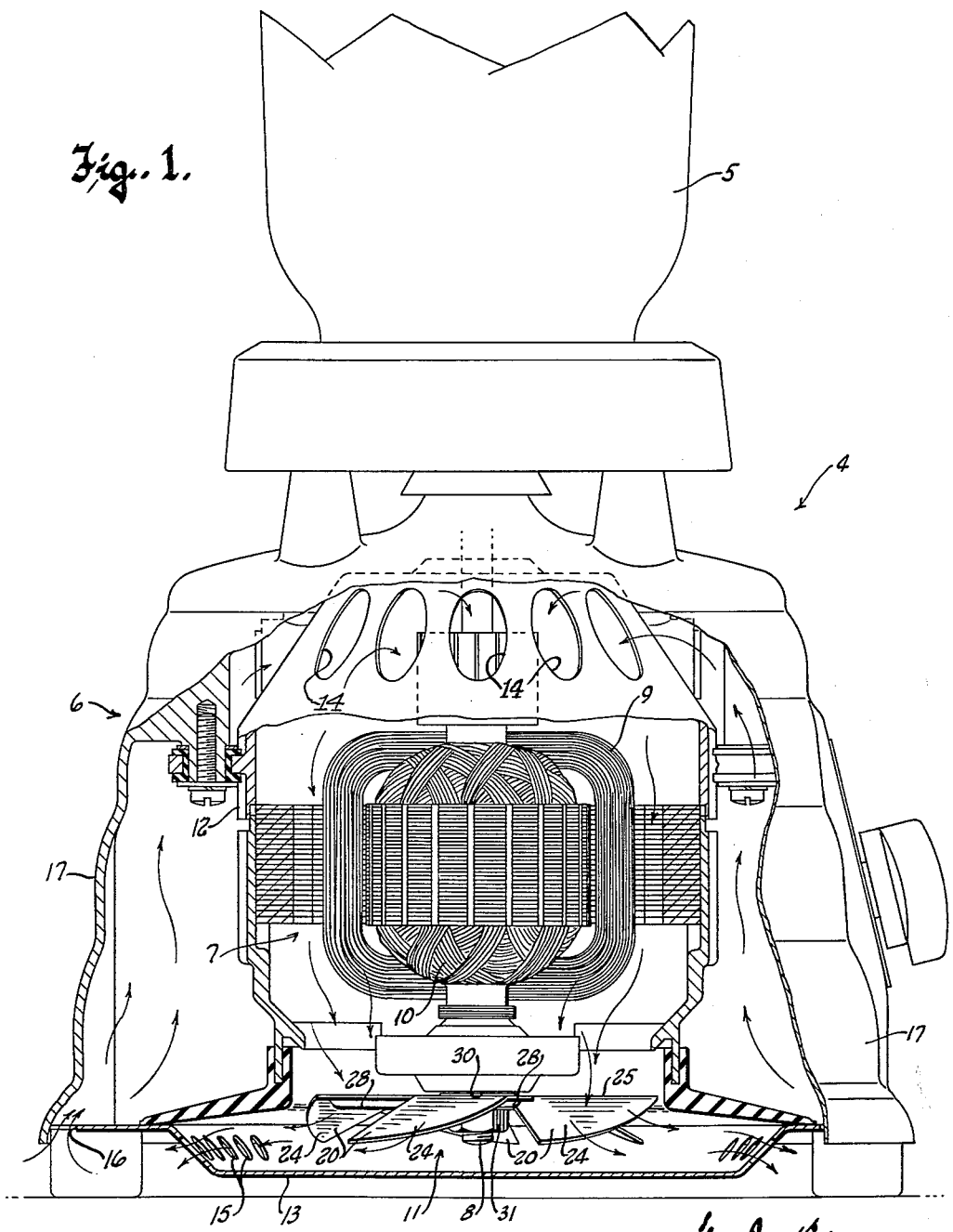
FIGURE 1 is a fragmentary view of a food comminuting machine, shown partly in side elevation and partly in section along the plane of the line 1—1 in FIGURE 2, illustrating a typical application of a motor with a variable pitch cooling fan embodying the principles of this invention.
Figure 2:
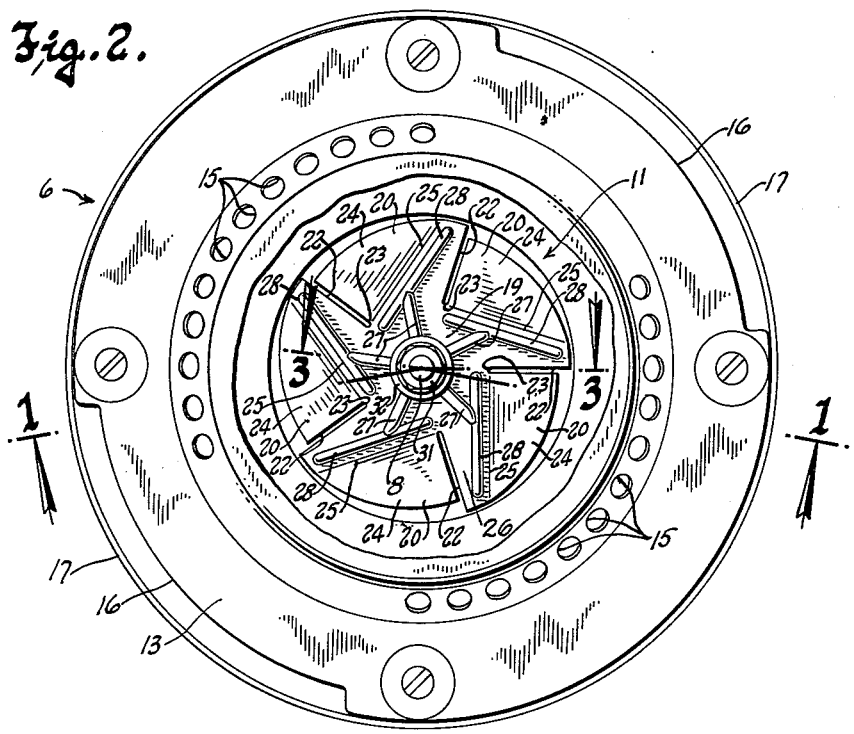
FIGURE 2 is a bottom view of the food comminuting machine shown in FIGURE 1, with a portion of the bottom wall of the machine broken away to show the fan.

Referring now to the accompanying drawings, in which like numerals designate like parts throughout the several views, the numeral 4 designates generally a food comminuting machine of a well known type, having a mixing vessel 5 in which food materials may be comminuted and mixed and a power base 6 which supports the mixing vessel and comprises a housing for an electric motor 7 of the universal type by which the machine is rotatably driven. As is conventional, the motor has a wound stator or field 9 and a wound rotor or armature 10 which is anchored to and carried by a shaft 8 journaled in the base for rotation on an upright axis.

When the motor 7 is running, the flow of current in its armature and field windings produces a certain amount of heat, the temperature rise being substantially proportional to the load on the motor. If some means were not provided for cooling the motor, the heat thus generated in its windings would tend to become excessive, particularly at times when the motor was running under a heavy load, and the windings would be damaged or destroyed. For this reason it is conventional to provide a propeller or cooling fan 11, secured to the motor shaft 8 for rotation therewith, by which cooling air is drawn across the windings of the field and armature. The air is guided in its flow by a substantially cylindrical baffle 12 which closely surrounds the motor and extends downwardly to the bottom wall 13 of the housing. The cooling fan, which is located at the lower end of the motor shaft, draws air downwardly through inlet ports 14 in the baffle, near its top, and expels it through outlet ports 15 in the medial portion of the bottom wall 13 of the housing. The air is drawn upwardly into the housing through inlets 16 in the bottom housing wall, near the side wall 17 of the housing, and flows upwardly to the baffle inlet ports 13 through the substantially annular space between the baffle 12 and the housing side wall 17.

The fan 11 of this invention is of the type in which blade pitch automatically decreases with increasing motor speed. Since the universal type motor requires relatively little cooling at its highest speeds, because it can attain such speeds only when it is loaded very lightly or not at all, the fan of this invention assures adequate cooling for the motor under all conditions, but produces substantially less noise at high speeds than a fixed pitch fan having comparable cooling capacity at low motor speeds.

The fan or propeller 11 is formed of a single disclike piece of resilient material, cut and bent to provide a hub portion 19 and blades 20 which are integral with the hub portion. Preferably the fan is fabricated as a stamping of resilient sheet metal, such as shim stock, but whatever metal is selected should be a springy material suitable for blanking and forming and be of such quality as to assure adequate flexure life and freedom from fatigue.

The disc which comprises the fan is preferably circular, and it has a concentric shaft receiving hole 21 through its hub portion and a plurality of narrow, angularly equispaced slits 22 which define the hub portion and the several blades. The slits, which open to the periphery of the disc, extend substantially radially outwardly from the central hub portion 19 and have their bottoms 23 spaced equal distances from the shaft hole 21.

To provide the desired normal pitch for the fan, each blade has a trailing portion 24 that is bent out of the plane of the hub portion, at an oblique angle thereto, along a bend line 25 that extends to the periphery of the disc from the bottom of the slit 22 that defines one edge of the blade trailing portion 24. Attention is directed to the fact that the radially outer end of the bend line 25 is circumferentially spaced a substantial distance in advance of its inner end, in the direction of blade rotation. The leading edge portion 26 of each blade, which is coplanar with the hub portion of the disc, comprises the area between the bend line 25 of the blade and the slit 22 next ahead of said bend line in the direction of blade rotation.

Figure 3:
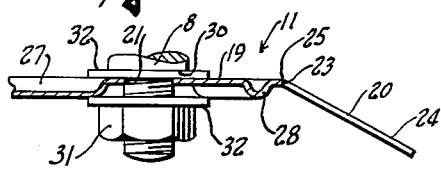
FIGURE 3 is a fragmentary sectional view through the fan of this invention on an enlarged scale, taken along the plane of the line 3—3 in FIGURE 2, showing a blade in the position it assumes when the fan is at rest or rotating quite slowly.
Figure 4:
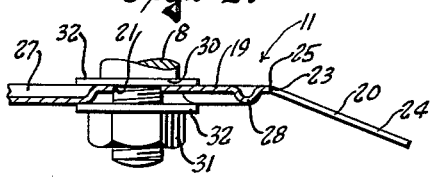
FIGURE 4 is a view similar to FIGURE 3 but illustratinng the position that the blade assumes at moderately high fan speeds.
Figure 5:
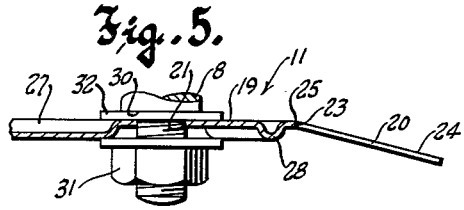
FIGURE 5 is a view similar to FIGURE 2 but showing the blade in the position it assumes at the highest speeds of fan rotation.

It will be observed that the trailing portion 24 of each blade has a segmental shape and, because of its inclination to the hub portion, rotation of the fan causes it to impart axial motion to the air which it engages, in the manner of a screw propeller. Due to the orientation of the bend line 25 of each blade trailing portion, its surfaces are disposed at an oblique angle both to the fan axis and to radii of the fan, so that as the fan rotates both centrifugal force and air load reactions create moments upon the trailing portion of the blade which tend to swing it around the bend line toward coplanar relationship with the hub portion and the leading edge portion of the blade, from its normal position illustrated in FIGURE 3, through the intermediate speed position shown in FIGURE 4, to the high speed position shown in FIGURE 5.

It will now be apparent that the specific arrangement of the slots 22 and the bend lines 25 are subject to wide variation, but that it is essential in any such arrangement that the bend line must be non-radial, to permit the blade (or the training portion thereof) to flex toward coplanar relationship with the hub in response to centrifugal force, which of course is exerted radially outwardly upon the obliquely inclined blade mass.

To stiffen the hub portion of the disc and prevent it from flexing with the trailing portions of the blades, it is provided with ribs 27 which extend substantially radially through the hub portion, preferably bisecting the angles defined by the slits 22. Other ribs 28, lying radially inwardly adjacent and parallel to the bend lines, stiffen the leading edge portion of each blade. Each of the radial ribs 27 extends outwardly to the point where it intersects one of the ribs 28, and each of the ribs 28 extends substantially the entire length of the bend line which it parallels.

Preferably all of the ribs 27 and 28 are formed integrally with the unitary disc comprising the fan, being offset to that side of the plane of the hub portion toward which the trailing portions of the blades are angled. Hence, as may be seen from FIGURES 3, 4 and 5, the ribs 28 that extend along the leading edge portions of each blade facilitate flexing of the trailing edge portions to effect change of blade pitch, in addition to their function of stiffening the leading edge portions.

The fan of this invention may be secured to a motor shaft in the conventional manner, that is, it may be confined between a shoulder 30 on the shaft and a nut 31 threaded onto the shaft to oppose the shoulder. Washers 32 are confined against the opposite faces of the hub portion by the nut and the shoulder, and it will be observed that because of their slight axial resilience the radial ribs 27 cooperate with the washers in locking the nut 31 against retrograde motion relative to the shaft, besides performing their important function as stiffeners for the hub portion.

From the foregoing description taken together with the accompanying drawings it will be apparent that this invention provides an automatic variable pitch fan propeller which is particularly well suited for use as a cooling fan for small motors by reason of the fact that it can be inexpensively formed as a unitary sheet metal stamping and can be easily and securely fastened to the motor shaft.

What is claimed as my invention is:

1. A variable pitch fan comprising: a member fabricated from resiliently flexible sheet material and having a central portion providing a substantially flat hub for the fan adapted for securement to a rotatable shaft; and a plurality of blades joined to and projecting from the hub, the outer portions of said blades being entirely free of one another, and each blade having a leading edge portion which is substantially coplanar with the hub and extends substantially radially therefrom to the outer edge of the fan, and having a trailing portion bent obliquely to one side of the plane of the hub along a straight line which diverges inwardly from said leading edge of the blade and extends from a point on the outer edge of the blade adjacent to said coplanar portion thereof to the junction between the hub and the leading edge of the following blade, the disposition of said bend lines rendering the trailing portions of the blades readily flexible toward the plane of the hub in response to centrifugal force during high speed rotation of the fan.

2. The variable pitch fan of claim 1 further characterized by: the provision of indentations in said coplanar portions of the blades, each defining an elongated rib located radially inwardly adjacent to and extending lengthwise along one of said bend lines, spaced from and in inwardly divergent relation to the leading edge portions of the blades to reinforce the same against flexure during high speed rotation of the fan.

3. The variable pitch fan of claim 2 wherein said ribs extend along the entire length of the bend lines and are offset to the side of the hub to which the trailing portions of the blades are bent to facilitate flexure of the trailing portions of the blades toward coplanar relationship with the hub.

4. The variable pitch fan of claim 3 further characterized by the fact that the hub of the fan is provided with indentations defining a number of radial ribs angularly equispaced about the axis of the fan to stiffen the hub and prevent its flexing with the blades as the latter react to rotational speeds above a predetermined value, said radial ribs, by their axial resilience, being cooperable with fastening means by which the fan may be secured on a shaft to constrain the fan to rotate with the shaft, and said radial ribs terminating short of the bent portions of the blades so as not to interfere with the flexing thereof toward the plane of the hub as the speed of fan rotation increases above said predetermined value.

References Cited in the file of this patent

UNITED STATES PATENTS

| | | |
|---|---|---|
| 223,642 | Finley | Jan. 20, 1880 |
| 1,668,462 | Oswald | May 1, 1928 |
| 1,669,569 | Meyer | May 15, 1928 |
| 1,868,528 | Gardner | July 26, 1932 |
| 2,032,224 | Paton | Feb. 25, 1936 |
| 2,176,325 | Bretzlaff et al. | Oct. 17, 1939 |
| 2,235,461 | Miller | Mar. 18, 1941 |
| 2,370,600 | Wightman | Feb. 27, 1945 |
| 2,801,793 | Kline | Aug. 6, 1957 |
| 2,912,159 | Ganger et al. | Nov. 10, 1959 |
| 2,957,621 | Haims | Oct. 25, 1960 |
| 2,965,180 | Killam | Dec. 20, 1960 |

FOREIGN PATENTS

| | | |
|---|---|---|
| 24,816 | Great Britain | Oct. 27, 1894 |
| 2,433 | Great Britain | Jan. 30, 1908 |